United States Patent [19]

Sham et al.

[11] Patent Number: 5,256,719
[45] Date of Patent: Oct. 26, 1993

[54] FLAME RETARDANT PLASTICS COMPOSITION BASED ON A POLYAMIDE, A POLYOLEFIN, AND MAGNESIUM HYDROXIDE

[75] Inventors: Chi K. Sham, Arnhem; Frederik J. Rietmeijer, Westervoort, both of Netherlands

[73] Assignee: DSM N.V., Heerlen, Netherlands

[21] Appl. No.: 943,680

[22] Filed: Sep. 11, 1992

[30] Foreign Application Priority Data

Sep. 12, 1991 [NL] Netherlands .............. 9101540

[51] Int. Cl.$^5$ .................... C08G 63/48; C08J 3/10
[52] U.S. Cl. .................... 524/436; 524/413; 524/262; 524/606; 525/66
[58] Field of Search ............... 524/436, 413, 262, 606; 525/66

[56] References Cited

U.S. PATENT DOCUMENTS 4,891,399  1/1990  Ohkawa et al. ............... 524/430
4,963,610  10/1990  Schmid et al. ............... 524/436

FOREIGN PATENT DOCUMENTS 0335165  10/1989  European Pat. Off. .
0418068  3/1991  European Pat. Off. .

OTHER PUBLICATIONS

Derwent Abstract, 79-60475B, Dec. 14, 1985, JP-B-6-0-057457.

*Primary Examiner*—John Kight, III
*Assistant Examiner*—T. Mosley
*Attorney, Agent, or Firm*—Cushman, Darby & Cushman

[57] ABSTRACT

The invention relates to a flame retardant plastics composition and based on a polyamide, a polyolefin, and magnesium hydroxide of the following composition:

(1) 5 to 52 wt. % of a polyamide (PA),
(2) 8 to 55 wt. % of a polyolefin (PO) composition comprising polypropylene at least partially functionalized with a compound containing an ethylenically unsaturated group and/or a propylene group and a carboxylic acid group, acid anhydride group, acid amide group, imido group, carboxylic ester group, amino group, or hydroxyl group, and
(3) 40 to 70 wt. % of magnesium hydroxide particles in platelet form having a specific surface area of not more than 18 m$^2$/g.

A major portion of the compositions according to the invention satisfies the Underwriters Laboratories Inc. V$_0$ rating and the compositions also stand out through favorable rheological behavior and the fact that articles made from them by injection moulding have an exceptionally smooth surface.

12 Claims, No Drawings

FLAME RETARDANT PLASTICS COMPOSITION BASED ON A POLYAMIDE, A POLYOLEFIN, AND MAGNESIUM HYDROXIDE

FIELD OF THE INVENTION

The invention relates to a flame retardant plastics composition based on a polyamide, a polyolefin, and magnesium hydroxide.

BACKGROUND OF THE INVENTION

Flame retardant plastics compositions based on a polyamide, a polyolefin, and magnesium hydroxide reinforced with 3-30 wt. % of glass fibres are known from EP-A-335 165. It should be noted that the presence of glass fibres is essential to sufficiently flame retardant properties being obtained. The drawbacks to compositions containing glass fibres are that their preparation results in heavy wear on the extruders while the products formed from them give rise to warping.

A further drawback to the known compositions is that they cannot easily be injection moulded because of a high apparent melt viscosity at the ensuing rates of shear.

SUMMARY OF THE INVENTION

The invention now provides a plastics composition with flame retardant properties which is readily processable into products having superior physical properties.

The invention consists in that the plastics composition of the known type mentioned in the opening paragraph comprises a blend based on
(1) 5 to 52 wt. % of a polyamide (PA),
(2) 8 to 55 wt. % of a polyolefin composition comprising polypropylene (PO) and at least partially functionalised with a compound containing an ethylenically unsaturated group and a group chosen from a carboxylic acid, acid anhydride, acid amide, imido, carboxylic ester, amino or hydroxyl group, and
(3) 40 to 70 wt. % of magnesium hydroxide particles in platelet form having a specific surface area of not more than 18 m$^2$/g.

DESCRIPTION OF THE INVENTION

The present invention relates to a flame retardant plastics composition based on a polyamide, a polyolefin, and magnesium hydroxide, wherein the composition comprises a non-fibre reinforced blend having 5 to 52 wt. % of a polyamide, 8 to 55 wt. % of a polyolefin composition, and 40 to 70 wt. % of magnesium hydroxide particles. In the present composition the polyolefin composition is at least partially functionalized with a compound containing an ethylenically unsaturated group and/or a propylene group and a carboxylic acid group, acid anhydride group, acid amide group, imido group, carboxylic ester group, amino group, or hydroxyl group. The magnesium hydroxide particles are in platelet form and have specific surface area of not more than 18 m$^2$/g.

Surprisingly, a major portion of the present compositions satisfies the Underwriters Laboratories Inc. V-0 rating (V-0, the optimum result, is followed in decreasing order by V-1, V-2 and HB (=horizontal burning)). This is all the more surprising in view of Example 6 of the aforementioned European Patent Application which reports that in the absence of glass fibres a V-0 rating could not be obtained with a copolyolefin concentration of 5 wt. %. According to the European patent application EP-A-335165, the desired V-0 rating reportedly could be obtained only by using glass fibres.

Further very surprisingly the compositions of the present invention exhibit a flexural modules in the absence of glass fibre reinforcement, that is equal to or better than the flexural modulus of the compositions disclosed in the examples of EP-A-335165.

Preferably the present composition comprises a blend based on 9 to 42 wt. % of a polyamide and 9 to 42 wt. % of a polyolefin that is at least partly functionalized.

The favourable flame retardant and processing properties of the compositions of the present invention are to be largely attributed to a completely different morphology from that of the known compositions as well as to a substantially improved rheological behaviour. In the case of the compositions according to the invention which essentially contain polyamide, this is manifested chiefly by an increase in melt viscosity, such as also occurs when glass fibres are present, and in a decrease of the apparent viscosity under a relatively high rate of shear, such as occurs when the material is injection moulded.

In the case of the compositions according to the invention which essentially contain polyolefin, the surprising aspect is primarily found to reside in the fact that the presence of polyamide considerably facilitates the magnesium hydroxide dispersion.

The magnesium hydroxide used the present invention preferably has a specific surface area of not more than 18 m$^2$/g. Insofar as possible, the particles employed preferably should be well-crystallised with no or minimum agglomeration, and readily disintegrate upon incorporation into the plastics composition on account of the ensuing shear forces.

It was found that optimum results can be obtained if the magnesium hydroxide is provided with a surface coating showing affinity toward polyamide and/or polyolefin.

In the present invention it is preferred to use a flame retardant plastics composition containing an amount of magnesium hydroxide in the range of 45-65 wt. %.

The thermoplastic polyamides suitable for use according to the present invention are homo- as well as copolyamides. In general, they are obtained by polycondensation of difunctional monomers, e.g., by the condensation of diamines and dicarboxylic acids, and by the polymerisation of lactams, such as ε-caprolactam. Examples of suitable dioic acids include: carboxylic acid, oxalic acid, glutaric acid, adipic acid, pimelic acid, suberic acid, azelaic acid, sebacic acid, dodecanedicarboxylic acid, and the like. Examples of suitable diamines include: hydrazine, ethylene diamine, 1,4-butane diamine, hexamethylenediamine, 1,8-octane diamine, piperazine, and the like. Alternatively, aminocarboxylic acids may be used to prepare polyamides that can be employed according to the invention. As well as aliphatic polyamides there may be employed according to the invention aromatic polyamides in the preparation of which use is made of aromatic diamines and dioic acids. As suitable aromatic dioic acids may be mentioned: terephthalic acid, isophthalic acid, phthalic acid, and the like. Suitable aromatic diamines include o-phenylene diamine, 2,4-diaminotoluene, and 4,4,'-methylene dianiline.

The polyamides can be prepared in a known manner, e.g. by direct amidation, low temperature polycondensation of diamines and dioic acid chlorides, ring-opening polymerisation of lactams, addition of amines to activated double bonds, polymerisation of isocyanates, and reaction of formaldehyde with dinitriles.

Illustrative examples of suitable polyamides include: polyhexamethylene adipamide (polyamide-6,6), poly(ε-caprolactam) (polyamide-6), polypropiolactam (polyamide-3), polypyrrolidone (polyamide-4), poly(ω-enanthamide) (polyamide-7), polycapryllactam (polyamide-8), poly(ω-undecaneamide) (polyamide-11), polylaurolactam (polyamide-12), polyhexamethylene terephthalamide (polyamide-6,T), polytetramethylene adipamide (polyamide-4,6), and copolymers.

According to the invention preference is given to a plastics composition in which the polyamide is polyamide-6, polyamide-6,6, a copolyamide of polyamide-6 and polyamide-6,6, or a blend of polyamide-6 and polyamide-6,6.

Suitable polyolefins according to the present invention generally are homo- and/or copolymers composed of 2-20 carbon atoms. Preference is given in this case to olefins having 2-8 carbon atoms, such as propylene, 1-butene, 1-hexene, or octene. These polymers preferably have a melt index, determined at 190° C., of 0.1-30 g/10 minutes. The polyolefin composition comprises at least polypropylene, preferably at least 50% wt. of the polyolefin composition consists of polypropylene. At least a portion of the co- or homopolyolefins is functionalised with a compound having an ethylenically unsaturated group and a group chosen from a carboxylic acid, acid anhydride, acid amide, imido, carboxylic ester, amino and hydroxyl group. Examples of suitable functionalising compounds according to the invention include: maleic anhydride, maleic acid, fumaric acid, maleic imide, maleic hydrazide, methyl nadic anhydride, dichloromaleic anhydride, maleic acid diamide, a natural fat or oil, an unsaturated carboxylic ester, an acid amide or anhydride of an unsaturated carboxylic acid, an unsaturated alcohol, an unsaturated amine, a reaction product of a diamine and maleic anhydride, maleic acid, fumaric acid, maleic imide or maleic hydrazide, an adduct of a diene polymer or an ethylene-propylene copolymer to maleic anhydride, or a diene polymer or ethylene-propylene copolymer substituted with an amino, carboxyl, acid anhydride or hydroxyl group. In addition, fillers other than magnesium hydroxide may be incorporated to a limited extent into the plastics compositions according to the invention. Examples of fillers include talcum, calcium carbonate, wollastonite and silicates. The plastics compositions according to the invention may also be intermixed with other synthetic materials, such as polycarbonates, polyester carbonates, polyphenylene oxide, polyphenylene sulphide, and polyarylates. Also, polyfluorocarbon compounds, such as PTFE, and pigments, stabilisers, and plasticisers may be incorporated into the present compositions.

The present plastics compositions are prepared by melt-mixing. There are no special limits on either the time needed for this process or the temperature at which it is carried out. Proper conditions are dependent on the composition of the material. The mixing temperature is usually in the range of 190° to 280° C. As a rule, the shortest possible residence time will be aimed at, in order to inhibit decomposition. Mixing may be carried out either continuously or discontinuously in an extruder, a Banbury mixer, rollers, and kneaders. Preference is given in this case to a continuous process, in which a twin-screw extruder is used with advantage. In general, the following procedure is adopted: the polyamide and the polyolefin and, optionally, a portion of the magnesium hydroxide are fed to the extruder throat, after which the remainder of the magnesium hydroxide is added further downstream. Alternatively, of course, all ingredients can be fed to the extruder throat together.

The invention will now be illustrated with reference to the following examples. Of course these are not to be construed as limiting in any manner to the scope thereof.

Unless otherwise specified, all amounts in the examples below are amounts by weight. The ingredients employed in the examples had the following properties:

a) polyamide-6 (ex Akzo Plastics) having $\eta_{rel}=2.0$ (1 g per 100 ml of 90% formic acid) at 25° C.

b) polyamide-6 (ex Akzo Plastics) having $\eta_{rel}=2.35$ (1 g per 100 ml of 90% formic acid) at 25° C.

c) polypropylene (HY6100 ex Shell) having $^MFI(230°$ C./21,6N): 1.5 dg/min.

d) functionalised polypropylene BLF 1527 (ex Akzo Plastics), composed of polypropylene (b) modified with 0.2 wt. % maleic anhydride in the presence of a peroxide as catalyst.

e) ethylene-propylene copolymer functionalised with maleic anhydride (Exxelor PO X1-1015 ex Exxon).

f) magnesium hydroxide (Magnifin H10B ex Martinswerk).

g) Keltaflex KN35 (ex DSM), a blend of EPDM-rubber and an ethylene-propylene copolymer with maleic anhydride grafted thereon.

EXAMPLE I

The magnesium hydroxide-filled blends of polyamide and polypropylene were prepared on a Werner & Pfleiderer ZSK 30 vented twin screw extruder at a rate of 300 r.p.m. and a set temperature profile of 250°- 250°- 260°- 260°- 260°-260° C.

The resulting granular product was injection moulded on a DemagD 60 NC III-275A injection moulding machine (tie rods, HDT rods) and an Arburg injection moulding machine (Φ=25 mm).

The composition of these blends and the data for the properties measured on them are given in Table 1. Said properties were measured in accordance with the following standards:

|  | Standard |  |
|---|---|---|
| Yield stress (MPa) | ISO R527 |  |
| Yield strain (%) | ISO R527 |  |
| Flexural modulus (MPa) | ISO 178 |  |
| Flexural stress (MPa) | ISO 178 |  |
| Izod 1/8", notched (kJ/m$^2$) | ISO 180/4A |  |
| Izod 1/8", unnotched (kJ/m$^2$) | ISO 180/4C |  |
| Charpy, unnotched (kJ/m$^2$) | ISO 179/2D |  |
| HDT-A (°C.) | ISO 75 |  |
| HDT-B (°C.) | ISO 75 |  |
| Flammability (HB, V-2, V-1, V-0) | UL-94 1/16" |  |
| Appearance injection moulded | − | poor |
| products | o | passable |
|  | + | good |
|  | ++ | very good |

TABLE 1 flame retardant blend of PA and PP filled with Mg(OH)₂

| | Composition (wt. %): | | | | | | |
|---|---|---|---|---|---|---|---|
| | A | | | B | C | D | E |
| | 1 | 2 | 3 | | | | |
| modified polypropylene BLF 1527 (d) | 8.0 | 16.0 | 32.0 | | | | |
| polypropylene (HY6100) (c) | | | | 14.4 | 40.0 | | 12 |
| modified ethylene-propylene copolymer (e) | | | | 1.6 | | | 4 |
| polyamide 6 (b) | 32.0 | 24.0 | 8.0 | 24.0 | | | 24.0 |
| polyamide 6 (a) | | | | | | 40 | |
| magnesium hydroxide (Magnifin H10B ex Martinswerk) (f) | 60.0 | 60.0 | 60.0 | 60.0 | 60.0 | 60.0 | 60.0 |
| Property | | | | | | | |
| Breaking strength (MPa) | 68 | 54 | 38 | 44 | 21 | 82 | 52 |
| Elongation at break (%) | 1.2 | 1.7 | 2.6 | 0.8 | 0.5 | 0.9 | 1.1 |
| Flexural modulus (MPa) | — | 8200 | — | 8400 | 5800 | 8400 | 8300 |
| Flexural stress (MPa) | — | 100 | — | 80 | 42 | 132 | 90 |
| Izod (kJ/m²) (notched) | 3.2 | 3.4 | 4.2 | 2.0 | 1.1 | 1.5 | 3.2 |
| Izod (kJ/m²) | 21 | 41 | 28 | 15 | 7.7 | 19 | 14 |
| HDT-A (°C.) | 125 | 115 | 102 | 122 | 75 | 135 | 118 |
| HDT-B (°C.) | 190 | 165 | 143 | 174 | 117 | — | 182 |
| UL-94 1/16" | V-0 | V-0 | V-0 | V-0 | HB | V-2 | V-0 |
| Surface appearance | ++ | ++ | + | + | o | — | + |

It is clear from the results listed in the table above that composition D, made up exclusively of polyamide as thermoplastic synthetic material and 60 wt. % of magnesium hydroxide, still fails to satisfy the standard for V-0 quality set by Underwriters Laboratories. Further, the surface appearance of the injection moulded products is wholly unsatisfactory. The appearance of the products injection moulded from compositions A, B, and E according to the invention, in which the polyamide has been replaced partly by polypropylene, in each case ranged from good to very good. It is also clear from the table that the other physical properties of compositions A, B, and E according to the invention were evidently superior to those of blend C composed exclusively of polypropylene and Mg(OH)₂. The Izod impact strength of compositions B and E containing a modified ethylene-propylene copolymer was somewhat lower that that of composition A.

EXAMPLE II

In a manner analogous to that disclosed in Example I a number of blends were prepared of the composition and properties listed in the table below.

TABLE 2 flame retardant blend of PA and PP filled with Mg(OH)₂

| | Composition (wt. %): | | |
|---|---|---|---|
| | F | H | I |
| modified polypropylene BLF 1527 (d) | | 8 | 14 |
| modified EPR-rubber (g) | 9 | 4 | |
| polyamide 6 (b) | 36 | 28 | 26 |
| magnesium hydroxide (Magnifin H10B ex Martinswerk) (f) | 55.0 | 60.0 | 60.0 |
| Property | | | |
| Breaking strength (MPa) | 49 | 62 | 63 |
| Elongation at break (%) | 2.3 | 1.7 | 1.4 |
| Flexural modulus (MPa) | 5200 | 8200 | 9300 |
| Flexural stress (MPa) | 86 | 116 | 115 |
| Izod (kJ/m²) | — | 40 | 22 |
| Charpy (kJ/m²) | 31 | — | — |
| HDT-A (°C.) | 97 | 112 | 124 |
| UL-94 1/16" | V-1 | V-0 | V-0 |
| Surface appearance | o | + | ++ |

The results given in the table above show that the present blends have an optimum impact strength when using a blend of modified polypropylene and modified EPR-rubber.

We claim:

1. A flame retardant plastics composition based on a polyamide, a polyolefin, and magnesium hydroxide which comprises a blend not reinforced with fibres of:
   (1) 5 to 52 wt. % of a polyamide (PA);
   (2) 8 to 55 wt. % of a polyolefin (PO) composition comprising polypropylene and at least partially functionalised with a compound containing an ethylenically unsaturated group and a group chosen from a carboxylic acid, acid anhydride, acid amide, imido, carboxylic ester, amino or hydroxyl group, and
   (3) 40 to 70 wt. % of magnesium hydroxide particles in platelet form having a specific surface area of not more than 18 m²/g.

2. A flame retardant plastics composition based on a polyamide, a polyolefin, and magnesium hydroxide which comprises a blend of:
   (1) 9 to 42 wt. % of polyamide (PA)
   (2) 9 to 42 wt. % of a polyolefin (PO) composition comprising polypropylene and at least partially functionalized with a compound containing an ethylenically unsaturated group and a group chosen from a carboxylic acid, acid anhydride, acid amide, imido, carboxylic ester, amino or hydroxyl group, and
   (3) 40 to 70 wt. % of magnesium hydroxide particles in platelet form having a specific surface area of not more than 18 m²/g.

3. A plastics composition according to claim 1, wherein said amount of magnesium hydroxide is in the range of 45 to 60 wt. %.

4. A flame retardant plastics composition according to claim 1, wherein said polyamide is polyamide-6, polyamide-6,6, a copolyamide of polyamide-6 and polyamide-6,6 or a blend of polyamide-6 and polyamide-6,6.

5. A flame retardant plastics composition according to claim 1, wherein said polyolefin is polyethylene, polypropylene, a copolymer of either of these polymers, or a blend thereof.

6. A flame retardant plastics composition according to claim 1, wherein said magnesium hydroxide is provided with a surface coating showing affinity toward polyamide and/or polyolefin.

7. A flame retardant plastics composition according to claim 1, wherein said polyolefin is functionalised with maleic anhydride.

8. A flame retardant plastics composition comprising:
(A) a blend of 9 to 42 wt. % of a polyamide selected from the group consisting, polyamide-6, polyamide-6,6, a copolyamide of polyamide-6 and polyamide-6,6, and a blend of polyamide-6 and polyamide-6,6;
(B) 9 to 42 wt. % of a polyolefin composition of at least one polyolefin selected from the group consisting of polyethylene, polypropylene, a copolymer of polyethylene and polypropylene, and a blend of polyethylene and polypropylene with the proviso that said polyolefin composition contains at least 50 wt. % of polypropylene and that said polyolefin composition is at least partially functionalised with a compound containing an ethylenically unsaturated group and a group selected from the group consisting of carboxylic acid, acid anhydride, acid amide, imido, carboxylic ester, amino and hydroxyl; and
40 to 70 wt. % of magnesium hydroxide particles in platelet form having a specific surface area of not more than 18 $m^2/g$, said magnesium hydroxide particles having a surface coating showing affinity toward at least one of (A) or (B).

9. A flame retardant plastics composition according to claim 8, wherein said polyolefin composition is present in an amount of at least 12 wt. %.

10. A flame retardant composition according to claim 8, wherein said polyolefin composition is present in an amount of at least 14 wt. %.

11. A flame retardant composition according to claim 8, wherein said polyolefin composition is a blend of a functionalized polypropylene and EPR rubber modified with maleic anhydride.

12. A flame retardant composition according to claim 8, wherein said polyolefin composition is present in an amount of at least 40 wt. %.

* * * * *